United States Patent
Kamiya et al.

(10) Patent No.: US 6,769,698 B2
(45) Date of Patent: Aug. 3, 2004

(54) SEAL RING AND SEAL STRUCTURE AT FLANGE JOINT USED FOR COMPOSITE TANKS AND PIPES

(75) Inventors: Takanobu Kamiya, Nagoya (JP);
Makoto Watanabe, Nagoya (JP);
Tetsuya Iguchi, Tokyo (JP)

(73) Assignees: Mitsubishi Heavy Industries, Ltd.,
Tokyo (JP); Eagle Engineering Aerospace Co., Ltd., Tokyo (JP)

( * ) Notice: Subject to any disclaimer, the term of this patent is extended or adjusted under 35 U.S.C. 154(b) by 0 days.

(21) Appl. No.: 10/300,867

(22) Filed: Nov. 21, 2002

(65) Prior Publication Data

US 2003/0094768 A1 May 22, 2003

(51) Int. Cl.$^7$ ................................................. F16L 17/06
(52) U.S. Cl. ........................ 277/614; 277/604; 277/626; 277/644; 277/647
(58) Field of Search ................................. 217/604, 614, 217/626, 644, 647, 643, 314

(56) References Cited

U.S. PATENT DOCUMENTS

| | | | | |
|---|---|---|---|---|
| 1,985,475 A | * | 12/1934 | Victor | 138/139 |
| 3,879,043 A | * | 4/1975 | Tozer | 277/647 |
| 4,946,174 A | * | 8/1990 | Usui | 277/645 |
| 5,125,796 A | * | 6/1992 | Cromer | 415/174.2 |
| 5,247,918 A | * | 9/1993 | Wakeman | 123/470 |
| 6,446,978 B1 | * | 9/2002 | Halling et al. | 277/626 |

FOREIGN PATENT DOCUMENTS

| | | |
|---|---|---|
| JP | 4-117957 | 10/1992 |
| JP | 7-208125 | 8/1995 |

* cited by examiner

Primary Examiner—Anthony Knight
Assistant Examiner—E Peavey
(74) Attorney, Agent, or Firm—Wenderoth, Lind & Ponack, L.L.P.

(57) ABSTRACT

The object of this invention is to provide a structure of seal ring, and seal structure using the seal ring for flange joints of composite tanks and pipes, that prevents seal surface variations due to differences in thermal contraction between the seal ring and the tank/the flange joint, etc., that improves the resilience of the seal, and that prevents gas leakage due to poor sealing, in order to achieve the stable sealing. The seal ring fits into a ring groove formed in a sealed unit such as a tank unit or a flange joint to provide a tight seal to contain fluids. The heart-shaped seal ring has three curved surface areas that smoothly flow together, comprised of a first curved seal surface which contacts the formed surface of the ring groove, a second curved seal surface which contacts the seal surface of a second member (e.g. manhole cover), and a projecting curved surface on the opposite side. The foregoing seal ring is provided with a hollow cavity formed with the three curved surfaces of uniform thickness, and an indent that passes through from the hollow to the fluid introduction side.

7 Claims, 4 Drawing Sheets

SEAL RING AND SEAL STRUCTURE AT FLANGE JOINT USED FOR COMPOSITE TANKS AND PIPES

BACKGROUND OF THE INVENTION

1. Field of the Invention

The present invention relates to a seal ring which is used for sealing at adjoining junctions provided between flange joints of composite tanks, pipes made of fiber reinforced plastics, etc. and the flange joint covers, and a seal structure for flange joint for composite tanks and pipes which use said seal ring.

2. Description of the Related Arts

Lightweight, high-strength and carbon fiber reinforced plastic (CFRP) composite materials are widely used in aircraft to contain low temperature fluids in low temperature tanks and flange joints. Since such low temperature tanks and flange joints can contain very low temperature gases of approximately −250° C., the fluid seals at the tank and at the flange joint with the flange joint cover must be able to maintain a tight seal without being affected by thermal contractions from the very low temperature gases.

FIG. 4 shows an enlarged sectional view of the primary parts of a low temperature tank and a fluid seal between the tank unit and the manhole cover which covers manhole at the flange joint. In the figure, 10 represents the tank unit, and 11 is the manhole cover that covers the opening of the manhole on the top surface of tank unit 10. 15 is a ring-shaped ring groove formed in the top surface of tank unit 10. The ring-shaped seal ring 30 is inserted into said ring groove 15, and it seals off the gas flowing through the fluid leakage path 16 leading into said sink tank unit The foregoing seal ring 30 is a hollow ring with a round cross section (31 is the hollow cavity), its outside circumferential surface being in pressure contact with the outside circumferential surface 10c and bottom surface 10a of the foregoing ring groove 15, as well as with the bottom surface 11a of manhole cover 11, to thereby provide the above described gas seal.

In some cases, this low temperature tank, and the flange joint may contain very low temperature gases, approximately −250° C. as described above, which causes a differential in thermal contraction to arise between seal ring 30, which exhibits high thermal contraction, and tank unit 10, which exhibits low thermal contraction, such differences can cause the seal surface variations, and the sealing to fail between said seal ring 30 and tank unit 10 manhole cover 11, resulting in a gas leak.

Further, because the foregoing seal ring 30, having a circular section, hollow-ring shape, has low resilience, when manhole cover 11 is closed over tank unit 10, said seal ring 30 is compressed against the bottom surface 10a of ring groove 15 and the bottom surface of manhole cover 11, said seal ring 30 undergoes plastic deformation, which will eventually diminish its sealing properties, to make it prone to the same kind of seal failure and gas leakage described above.

Japanese Utility Model publication (Kokai) Hei 4-117957 disclosed technology designed to deal with this problem. As is shown in FIG. 1 of the publication, the seal ring becomes a peak shape in the areas where it makes contact with the ring groove and the cover, which makes it difficult to follow the above described differences in thermal expansion. Also, the seal ring shown in FIG. 8 of the publication features a conventional, sectionally circular shaped O-ring having a wide opening at the inner circumference to form a C-shaped cross section. Since the opening is wide at the inner circumference, however, it has a low spring constant and the seal surface pressure can not be high enough, so the sealing properties are not adequate in the top and bottom sealing areas. Another seal ring having a C-shaped cross section is disclosed in FIG. 4 of Japanese patent publication (Kokai) Hei 7-208125. This type of seal ring having C-shaped cross section is, however, suitable to seal only at the outer circumference.

SUMMARY OF THE INVENTION

The present invention addresses the problems in the prior arts. The object of this invention is to provide a seal ring, and seal structure using the seal ring for flange joints used for composite tanks and pipes, that prevent seal surface variations due to differences in thermal contraction between the seal ring and the tank/the flange joint, etc., that improve the resilience of the seal, and that prevent gas leakage due to poor sealing, in order to achieve the stable sealing.

To resolve this problems, the invention provides a seal ring which fits into a ring groove formed at a joint between adjoining surfaces of first and second joint members, at least one of which is made from resin materials, to provide a tight seal to contain fluids, wherein said seal ring is provided with a heart-shaped sectional shape and a hollow cavity, and made from resilient plate materials having a greater low temperature contraction rate than the low temperature contraction rate of said resin materials. The seal ring comprises: 1) a first curved seal surface which makes contact with the bottom surface of a ring groove provided in said first joint member; 2) a second curved seal surface which makes contact with said second joint member; 3) first and second resilient curved surfaces which curve respectively from said first and second curved seal surfaces towards the inside of the hollow cavity of said heart-shaped seal ring so as to provide an indent which forms an upper portion of the heart shaped cross section of said seal ring; and 4) a pair of opposing end surfaces respectively extending from said first and second resilient curved surfaces, wherein a gap is left between said pair of opposing end surfaces.

Another preferred embodiment of this invention discloses that the gap between said pair of opposing end surfaces is formed to a dimension that allows the pressure contact of said first and second curved seal surfaces onto said opposing joint members.

Yet another preferred embodiment of this invention discloses that the seal ring provides a tight seal in below zero low temperatures, and the inner circumferences of said first and second resilient curved surfaces are structured so as to maintain contact onto the inner wall of said ring groove even during low temperature contraction.

Further, another preferred embodiment discloses a seal structure. The seal structure is used in the flange joint used for pipes, composite tanks made from composite materials such as fiber reinforced plastics, or the like made from composite materials such as fiber reinforced plastics, which contain fluids. The seal structure is used to seal a fluid sealing joint between said flange and a cover for an opening of the flange joint. The seal structure comprises: 1) a ring groove in said fluid sealing joint, into which the fluid is flowed from inside of said flange; and 2) a seal ring to be inserted into said ring groove to prevent the leakage of said fluids to the outside. The seal ring fits into a ring groove formed at a joint between adjoining surfaces of first and second joint members, at least one of which is made from resin materials, to provide a tight seal to contain fluids, wherein said seal ring is provided with a heart-shaped sectional shape and a hollow cavity, and made from resilient materials having a greater low temperature contraction rate than the low temperature contraction rate of said resin materials. The seal ring comprises: 1) a first curved seal surface which makes contact with the bottom surface of a ring groove provided in said first joint member; 2) a second curved seal surface which makes contact with said second joint member; 3) first and second resilient curved surfaces which curve respectively from said first and second curved seal surfaces towards the inside of the hollow cavity of said heart-shaped seal ring so as to provide an indent which forms an upper portion of the heart shaped cross section of said seal ring; and 4) a pair of opposing end surfaces respectively extending from said first and second resilient curved surfaces, wherein a gap is left between said pair of opposing end surfaces.

Another preferred embodiment of this invention discloses the seal structure wherein said seal ring provides a tight seal in below zero low temperatures, and the inner circumferences of said first and second resilient curved surfaces are structured so as to maintain contact onto an inner wall of said ring groove even during low temperature contraction.

According to the invention, since the hollow, sectionally heart-shaped seal ring comprised of resilient plate materials has three curved surface areas that smoothly flow together, comprised of a first curved seal surface which contacts the formed surface of the ring groove, a second curved seal surface which contacts the seal surface of a second member (e.g. manhole cover), and a projecting curved surface on the opposite side to the fluid leakage path, said seal ring, using the projecting curved surface as support points, produces spring action in the vertical direction from the elastic deformation of the first curved seal surface and the second curved seal surface, to continually press against the bottom of the ring groove for the first curved seal surface and the seal surface of the second member (manhole cover) for the second curved seal surface at a constant pressure.

Thus, even if there were seal surface variations between the seal ring and the objects being sealed which is coursed by the difference of thermal contractions, the spring action of the said seal ring causes the first curved seal surface and the second curved seal surface to maintain contact at the required pressure against their opposing seal surfaces (the seal surface of the second member and the bottom surface of the ring groove), to thereby assuredly prevent the leakage to the outside of any fluid that had flowed into the ring groove from the objects being sealed.

Further, even if slack, etc. developed in the bolts used to attached the foregoing adjoining second member and allowed some separation of the contact surfaces between the sealed member and the adjoining second member, as described above, the spring action derived from the foregoing elastic deformation, would cause the first curved seal surface and the second curved seal surface to follow that movement, and maintain continual contact with the seal surfaces at the required pressure, to thereby prevent the leakage to the outside of any fluid that had flowed into the ring groove.

Further, according to the invention, the foregoing seal ring is hollow with walls of uniform thickness and it includes five curved surfaces: the foregoing first curved seal surface, the second curved seal surface, the first curved resilient member, the second curved resilient member, and the outside curved surface, and moreover, it is equipped with an indent that passes through from the hollow to the fluid introduction side, and accordingly any fluids leaking into said hollow cavity creates internal pressure that causes the first curved seal surface and the second curved seal surface to exert more pressure against their opposing seal surfaces to thereby improve the fluid seal functions of said first curved seal surface and second curved seal surface against their opposing seal surfaces.

DETAILED DESCRIPTION OF THE PREFERRED EMBODIMENTS

In this section we shall explain several preferred embodiments of this invention with reference to the appended drawings. Whenever the size, materials, shapes, relative positions and other aspects of the parts described in the embodiments are not clearly defined, the scope of the invention is not limited only to the parts shown, which are meant merely for the purpose of illustration.

Figure 1:
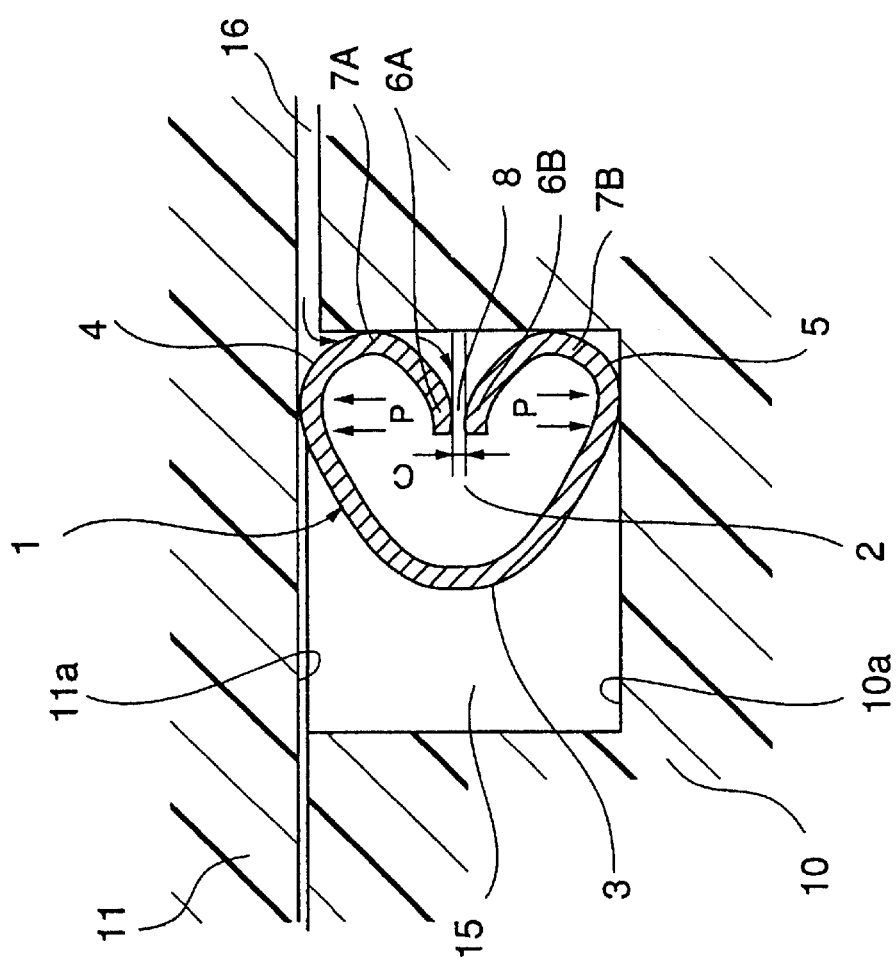
FIG. 1 is an enlarged sectional view of a sealing area of a low temperature tank for containing low temperature fluid according to an embodiment of this invention.
Figure 2:
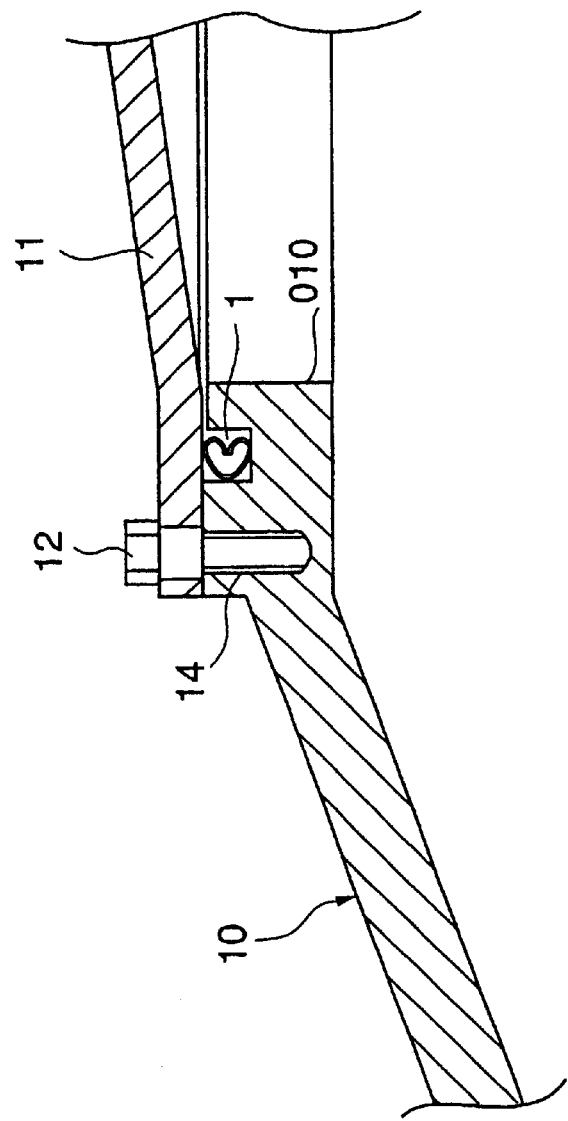
FIG. 2 is a sectional view of the primary parts around a manhole formed in the foregoing low temperature tank.
Figure 3:
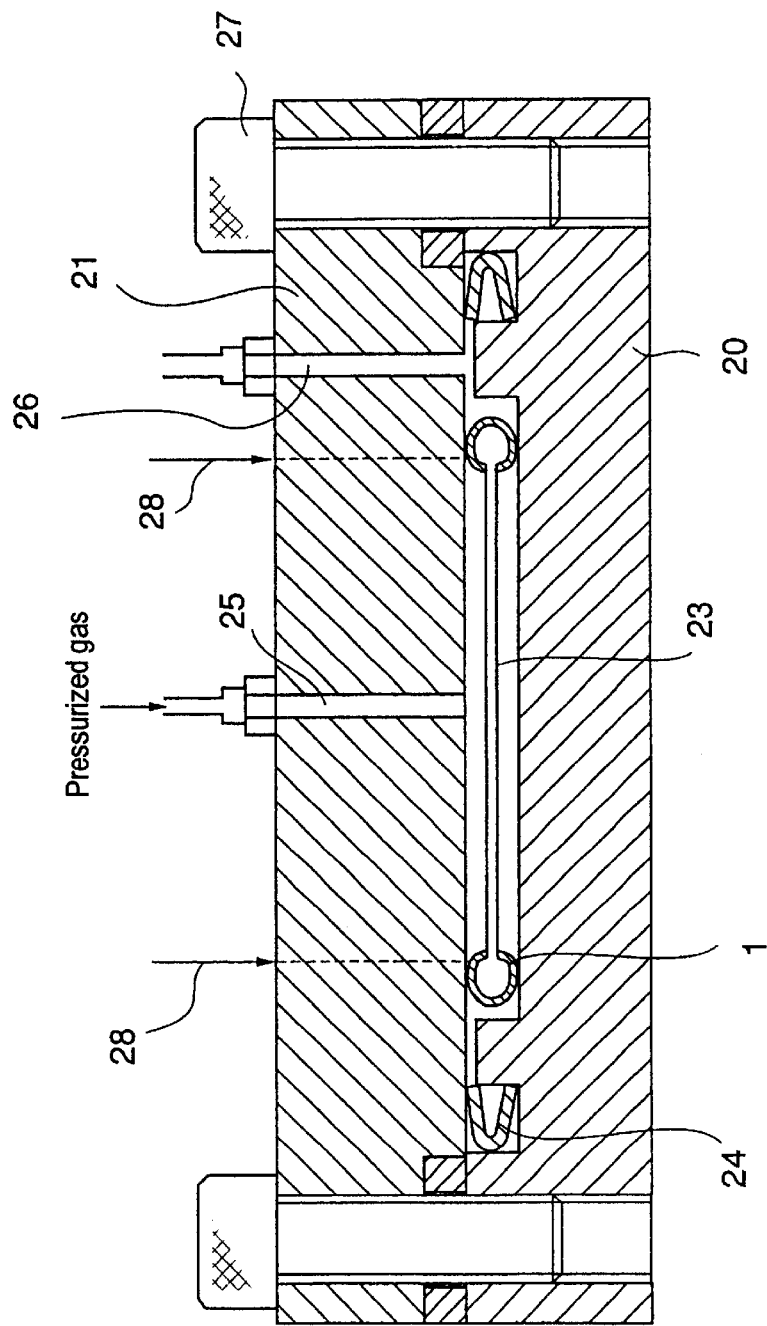
FIG. 3 is a sectional view of the leak testing device for the seal ring according to this invention.
Figure 4:
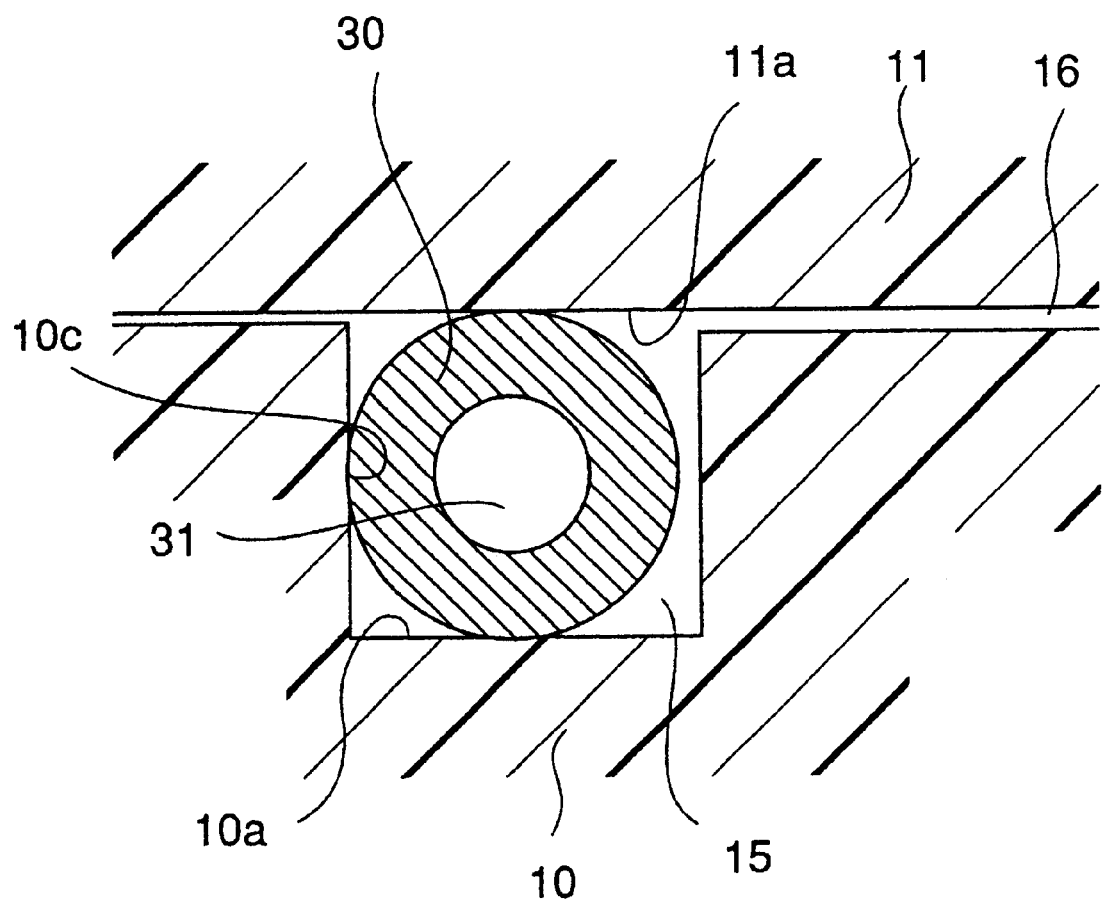
FIG. 4 shows a prior art which corresponds to FIG. 1.

FIG. 1 is an enlarged sectional view of a sealing area of a low temperature tank for containing low temperature fluid according to an embodiment of this invention. FIG. 2 is a sectional view of the primary parts around a manhole formed in the foregoing low temperature tank. FIG. 3 is a sectional view of the leak testing device for the seal ring according to this invention.

In FIG. 2, which shows a low temperature tank equipped with the seal ring of this invention, 10 represents the tank unit made from carbon fiber reinforced plastic (CFRP) which holds the low temperature fluid. 010 is a manhole opening on the top of said tank 10. 11 is a manhole cover that covers said manhole opening 010, and it is removably secured in place by a plurality of bolts 12 that thread into holes 14 formed in the tank unit 10. As will be described in further detail below, 1 represents the seal ring that seals the fluid inside the tank.

The present invention relates to the seal ring and its attachment structure when used in low temperature tanks, and in pipe flange joints and the like.

FIGS. 1 and 2 show the attachment area of the seal ring according to a preferred embodiment of this invention, wherein 10 is a tank unit, 11 is a manhole cover, 15 is a ring-shaped groove which is formed in the top surface of tank unit 10 at the junction area between tank unit 10 and manhole cover 11. 16 is a fluid leakage path, which passes from the inside of the foregoing tank unit 10 to the ring groove 15, and any fluid leaking from the foregoing tank unit flows through said fluid leakage path 16 and is guided into ring groove 15.

1 is the ring-shaped seal ring which is inserted into ring groove 15 to prevent fluid leakage to the outside, it is formed by bending an elastically deformable material such as steel into a curved shape.

The foregoing seal ring 1 is approximately heart shaped in cross section and comprised of a number of curved surfaces that flow smoothly from one to the other, including the first curved seal surface 5 which makes contact with bottom surface 10a of the foregoing ring groove 15; the second curved seal surface 4 which makes contact with the seal surface 11a on bottom surface of manhole cover 11, wherein the seal surface 11a faces ring groove 15; the resilient curved surfaces 7B, 7A, which curve respectively from the second curved seal surface 4 and first curved seal surface 5 so as to form an upper portion of the heart shaped cross section; the end surfaces 6B and 6A which are facing each other and form an indent 8 to form the upper portion of the heart shaped cross section; and an outward curved surface 3, which forms a lower portion of the heart shaped cross section, and projects outward on the side opposite the aforementioned fluid leakage path 16.

Further, said seal ring 1 contains an inner cavity 2 which is surrounded by the ring material on the outside, including the foregoing first and second curved seal surfaces 5, 4, that is of uniform thickness. There is also a gap c formed in indent 8 at the sectional center between the foregoing first curved seal surface 5 and second curved seal surface 4, which links the foregoing inner cavity 2 with the foregoing fluid leakage path 16.

As described above, the foregoing seal ring 1 is made of elastically deformable materials, the outside curved area of the outward curved surface 3 serves as a support point, while the first curved seal surface 5 and second curved seal surface 4 are elastically deformable in the vertical direction.

In composite low temperature tanks, and in flange joints equipped with the above described seal structure using the seal ring 1, said seal ring 1 is formed into a hollow heart shape with smoothly flowing curved surfaces, which are in contact with the bottom surface 10a of ring groove 15 by the first curved seal surface 5, with the seal surface 11a provided on the bottom surface of manhole 11 by the second curved seal surface 4, and which include the outward curved surface 3 projecting outward on the side opposite the aforementioned fluid leakage path 16. Because of this configuration of the seal ring, the foregoing outward curved surface 3 acts as a support point for the first curved seal surface 5 and second curved seal surface 4, which exert spring action due to their elastic deformation in the vertical direction in a manner such that said first curved seal surface 5 and second curved seal surface 4 exert constant pressure upon the seal surface 11a of manhole cover 11, and bottom surface 10a of ring groove 15, without any collapse of the first curved seal surface 5 or second curved seal surface 4.

Thus, even if there were seal surface variations between the seal ring 1 and the tank 10/manhole cover 11 which is heat coursed by the difference of thermal contractions between seal ring 1 and tank unit 10, the spring action of the said seal ring 1 causes the first curved seal surface 5 and the second curved seal surface 4 to maintain contact at the required pressure against their opposing seal surfaces (the seal surface 11a formed on the second member and the bottom surface 10a of the ring groove 15), to thereby assuredly prevent the leakage to the outside of any fluid that had flowed into the ring groove 15 leaked from the tank unit 10 through the fluid leakage path 16.

Further, even if slack, etc. developed in the bolts 12 used to attached the foregoing adjoining second member and allowed some separation of the contact surfaces between the tank unit 10 and the adjoining manhole cover 11, as described above, the spring action derived from the foregoing elastic deformation, would cause the first curved seal surface 5 and the second curved seal surface 4 to follow that movement, and maintain continual contact with the seal surfaces at the required pressure, to thereby prevent the leakage to the outside of any fluid.

Further, the foregoing seal ring 1 has inner cavity 2 with walls of uniform thickness and it includes first curved seal surface 5, the second curved seal surface 4, the outward curved surface 3, and moreover, it is equipped with an indent 8 that passes through from the cavity 2 to the fluid leakage path 16. Accordingly any fluids leaking into said inner cavity 2 through leakage path 16 and indent 8 creates internal pressure that causes the first curved seal surface 5 and the second curved seal surface 4 to exert more pressure against their opposing seal surfaces 11a, 10a to thereby improve the fluid seal functions of said first curved seal surface 5 and second curved seal surface 4 against their opposing seal surfaces.

FIG. 3 shows the principal parts of a fluid leak testing device for a seal ring 1 which is structured as described above. In the Figure, 21 represents the upper flange, 20 the lower flange, which, when both flanges 21, 20 are held together by tightening bolts 27, creates an internal fluid chamber 23. The foregoing seal ring 1 has been installed on the outer circumferential side of said fluid chamber 23. 24 is a backup seal for said seal ring 1, 28 is a laser displacement meter that detects any displacement of the seal ring 1.

The fluid leakage test using this fluid leakage testing device was performed by introducing pressurized helium gas (L $He_2$) into the fluid chamber 23 via the pressurized gas input passage 25 located in the center of the device, which acted on the indent side of the foregoing seal ring 1. An amounts of gas leaking from the contact areas of seal ring 1 was detected through the leak extraction passage 26.

The results indicated no gas detection from seal ring 1 through leak extraction passage 26 for low temperature tanks, and flange joints in the pressure ranges used by these connections. The results confirmed that the sealed area, using said seal ring 1, provided a highly effective seal.

The seal rings according to the present invention provide the below described outstanding effects. Since the seal ring according to the present invention is used to seal parts made of resin materials, the thermal contraction rate of the resilient material of the seal ring is different, exhibiting a greater thermal contraction rate than the resin materials when sealing fluids at low temperatures. At this time, sliding abrasions occur on the sealing surface of the resin parts across the contraction range for the seal ring. Normally, the sliding abrasion would lead to the leakage of the fluid sealed within the vessels, however the pressure generated in the inner cavity of the ring by fluid flowing therein acts to put pressure on the opposing joint members by the first curved seal surface and the second curved seal surface. At the same time, the first curved resilient surface and second curved resilient surface press against the inside wall of the ring groove and exert elastic pressure on the curvature of the first curved seal surface and the second curved seal surface against the joint members. As a result, even if the low temperature sealing capacity were to decline, the first curved seal surface and second curved seal surface will still exhibit enhanced sealing capability.

The seal ring according to the present invention, having the first curved seal surface and second curved seal surface of the seal ring, which together flow smoothly from the first curved seal surface to the first curved resilient member, and the second curved seal surface to the second curved resilient member, have their respective inside diameter surface in pressure contact with the inside wall of the ring groove as a support point. Further, the first and second end surfaces are in contact and support each other, so that the first curved seal surface and second curved seal surface are in tight contact with the apposing joint members. Accordingly, even if the sealing capacity should decline at low temperatures, the curved seal surfaces remain in tight contact with the joint members to provide improved sealing effectiveness.

The seal ring according to the present invention, even if the seal ring should contract, it is designed so that both curved surfaces contact the inside wall of the ring groove, and even if low temperature cause the ring to come into pressurized contact with the inside of the ring groove, damage to the inside circumference of the ring groove can be prevented since both resilient surfaces curve in toward the inside of the cavity to provide elastic deformation. At the same time, the curved resilient surfaces, being supported by the inside wall of the ring groove, enhance the sealing capability by improving the elastic pressure upon the first curved seal surface and second curved seal surface. Accordingly, even if low temperature were to cause degradation of the seal rings capabilities, both curved surfaces remain tightly in contact with the opposing joint members to deliver outstanding sealing effects.

What is claimed is:

1. A fluid seal structure sealing between a tank made of composite material including resin material, the tank including a fluid contained therein, and a cover covering an opening of the tank, comprising:

a ring groove formed at a joint between adjoining faces of first and second joint members of the tank and cover, at least one of said first and second joint members being made from said resin material; and a seal ring which fits into said ring groove so as to provide a tight seal to contain fluids, said seal ring having a heart-shaped sectional shape and a hollow cavity and being made from resilient material having a greater low temperature contraction rate than that of said resin material;

wherein said ring groove is provided in said first joint member;

wherein said seal ring comprises:
a first curved seal surface which makes contact with a bottom surface of said ring groove in said first joint member,
a second curved seal surface which makes contact with said second joint member,
first and second resilient curved surfaces which respectively curve from said first and second curved seal surfaces towards the inside of said hollow cavity and said heart-shaped sectional shape so as to provide an indent that forms the heart-shaped sectional shape, and
a pair of opposing end surfaces respectively extending from said first and second resilient curved surfaces so as to form a gap between said pair of opposing end surfaces;

wherein an outer circumference of said first and second resilient curved surfaces is structured so as to maintain contact with an inner side wall of said ring groove during low temperature contraction; and wherein a seal between the tank and cover is achieved by the cover covering the opening of the tank to seal the fluid in the tank from the outside with said first curved seal surface contacting with said bottom surface of said ring groove, said ring groove being provided in a sealing surface of the tank, and with said second curved seal surface contacting with a sealing surface of the cover facing the opening of the tank.

2. The fluid seal structure of claim 1, wherein said gap between said pair of opposing end surfaces is formed to a dimension that allows pressure contact of said first and second curved seal surfaces onto said opposing joint members when said opposing joint members are jointed.

3. The fluid seal structure of claim 1, wherein said seal ring further comprises an outward curved surface that is convex in a direction opposite to a fluid leakage path from the inside of the tank to the outside thereof between said opposing joint members, said outward curved surface connecting smoothly with said first and second curved seal surfaces.

4. The fluid seal structure of claim 1, wherein the cover is made of plastic material and the tank contains a low temperature fluid.

5. A fluid seal structure sealing in a flange joint between the flange joint and a cover covering an opening of the flange joint, comprising:

a ring groove formed in the flange joint into which fluid can flow from inside of the flange joint and between adjoining faces of first and second joint members, at least one of said first and second joint members being made from a resin material; and a seal ring which fits into said ring groove so as to provide a tight seal to contain fluids, said seal ring having a heart-shaped sectional shape and a hollow cavity and being made from resilient material having a greater low temperature contraction rate than that of said resin material;

wherein said ring groove is provided in said first joint member;

wherein said seal ring comprises:
a first curved seal surface which makes contact with a bottom surface of said ring groove in said first joint member,
a second curved seal surface which makes contact with said second joint member,
first and second resilient curved surfaces which respectively curve from said first and second curved seal surfaces towards the inside of said hollow cavity and said heart-shaped sectional shape so as to provide an indent that forms the heart-shaped sectional shape, and
a pair of opposing end surfaces respectively extending from said first and second resilient curved surfaces so as to form a gap between said pair of opposing end surfaces;

wherein an outer circumference of said first and second resilient curved surfaces is structured so that, during low temperature contraction, said first and second resilient curved surfaces maintain contact with an inner side wall of said ring groove.

6. The fluid seal structure of claim 5, wherein said first and second joint members form parts of a pipe.

7. The fluid seal structure of claim 5, wherein said first and second joint members form parts of a composite tank made from a fiber reinforced plastic material and containing a fluid.

* * * * *